3,271,239
PROCESS OF FORMING A WATER-LAID FIBROUS ARTICLE CONTAINING A $C_2$-$C_3$ POLYALKYLENE RESIN
Lloyd Hornbostel, Jr., Beloit, Wis., assignor to Beloit Corporation, Beloit, Wis., a corporation of Wisconsin
No Drawing. Filed Jan. 23, 1964, Ser. No. 339,575
5 Claims. (Cl. 162—169)

The instant invention relates to the use of resins in the formation of molded pulp articles, and more particularly, to methods and devices for the molding of resin-cellulosic fiber or pulp articles, and the products resulting therefrom.

Although it is well known that a paper web in sheet or molded pulp article form may be made from dilute fluid paper making stock using various types of cellulosic fibers and also using various types of paper treating resins, the instant invention is directed to certain specific improvements in connection with the overall concept, but departing substantially from prior art notions in connection therewith. For example, in the practice of the instant invention, certain conventional stock preparation and beating procedures may be carried out, and certain particulate forms of resin may then be added with additional beating to accomplish the desired range of distribution of fibers and particles in the stock. This is followed by the formation of a resin-filled pulp moist article by feeding such stock onto a suitable porous forming surface, of a general type of porous forming surface that is known in the art and typical examples thereof include so-called molding bodies of porous composition such as those disclosed on the copending application of Charles W. Modersohn and myself, Serial No. 89,451, filed February 15, 1961, now abandoned. The molds of this particular type with porous forming surfaces are preferred for use in the practice of the instant invention, because an important aspect of the instant invention involves the initial dewatering procedure, which is carried out by blowing air or other dry gas through the deposited wet pulp article on such porous surface in such a manner as to substantially dry the same without involving a pressure-time-temperature combination such that any significant fusion of the resin particles takes place during such initial drying operation. This drying operation is then followed by a molding operation in the sense that the final article is formed, preferably between smooth heated molding surfaces, i.e., usually male and female molds which apply significant pressure, under heat and time conditions, such that the heretofore randomly distributed resin particles, which have been previously deposited upon the randomly distributed felted cellulose fibers may be fused together to form a resin matrix or continuous phase in the finely molded article in which the resulting article consists essentially of a resin matrix of the thermoplastic resin here used and having smooth exterior resin surfaces on such article, with the resin matrix encapsulating substantially completely the randomly distributed, substantially dry, felted cellulosic fibers within the interior of such resin matrix. The article thus obtained is essentially a self-sustaining highly filled plastic body in which the last step converts the so-called discontinuous particulate unfused resin particles to a continuous resin matrix in which the randomly distributed cellulosic fibers are substantially completely encapsulated individually and as a group to such an extent that the exterior smooth surfaces of the article are smooth resinous, continuous resinous film like surfaces on the matrix body of the resin. The smooth surfaces are obtained by the selection of dyes of suitable configuration but having smooth surfaces themselves so as to impart the desired smooth surface to the resulting molded article. The instant articles are unique for use as containers or the like in that they are self-sustaining in structure and possess considerable structural strength in that the fibers function as reinforcement for the thermoplastic resin matrix, while the thermoplastic resin matrix serves as a protector encapsulating the fibers and protecting the same from drastic changes in moisture content, dimensions, or other changes which might be imparted to such cellulosic fibers in ambient conditions of use, in the absence of such protective encapsulating resinous matrix.

The instant invention involves a process for making such articles in such a way that the previously described advantageous properties in the articles are obtained to a maximum advantage. This process involves, among other things, the concept of drying the cellulosic fibers by means of air being drawn therethrough or through the article itself while supported on a porous surface which need not have exactly the configuration of the ultimately desired molded article, but may in other instances conveniently have substantially this configuration. The feature in this respect involves the blowing of air or other dry gas at reasonably warm temperatures, but at temperatures not sufficient to fuse the resin under the conditions of drying, so that the water may be removed substantially entirely from the cellulosic fibers in this manner without preliminary or premature encapsulation of the fibers with the fused resin, or without any tendency to fuse the resin and cause the same to move in one direction or another within the body of the drying pulp article so as to cause uneven resin distribution. For example, if a pulp molded article of the type herein described were to be formed in a conventional paper making machine on a forming wire, and passed through the press section of such conventional paper making machine, the dewatered product under these conditions might still have the desired random distribution of the relatively minute resin particles therein, although this would ordinarily require rather finely woven felts and other precautions to prevent washing of the resin particles off the fibers or away from the fibrous material; but even if we are to assume that in the conventional paper making machine at this stage we have an article which is a partially dried felted cellulosic pulp sheet containing randomly distributed resin particles in a reasonable concentration, this sheet could not be passed through the conventional paper machine dryers without causing irreparable damage and a total loss of the desired results here contemplated. The conventional paper machine dryers are heated to temperatures approximating the boiling point of water, which temperatures would not ordinarily be sufficient in and of themselves to cause immediate fusion of the resin particles, but the drying process on most conventional dryer sections of a paper machine involves prolonged travel over numerous dryer surfaces, with hot air impinging on the traveling paper web and with the steam heated dryers also imparting heat to the web to such an extent that there is a tendency for migration of the resin particles, usually toward the surface of the dryer and as a consequence, the resin particles on the surfaces of the dryers will not have the benefit of the cooling effect of water evaporating from the paper web itself and, if for no other reason, merely because these resin particles are in direct contact with the steam heated drying surfaces, localized heating thereof will take place and there will be premature fusion of the resin in such a way as to cause lack of uniform distribution, sticking of the web to the dryer and other undesirable results. These and other undesirable features are avoided in the practice of the instant invention.

Other objects, features and advantages of the present invention will become apparent to those skilled in the art from the following detailed disclosure thereof and the specific descriptions thereof hereinafter set forth.

The invention consists in a method of forming a molded pulp article, which comprises (a) forming a dilute aqueous stock suspension of cellulosic fibers; (b) depositing $C_2$–$C_3$ polyalkylene polymeric resin in discrete particulate form on the fibers in such stock; (c) forcing the resin-containing stock through a porous forming surface to deposit a resin particle filled fibrous pulp article on such surface; (d) forcing drying gas through said article and the porous surface carrying the same to substantially dewater the article under time-temperature conditions less than those required to fuse the resin; and (e) subjecting the dewatered article to time-temperature-pressure-shaping conditions to fuse the resin to form a fiber-filled resin matrix of predetermined configuration.

Considering first the type of fibers which are preferred for use in the practice of the instant invention, it will be appreciated that the fiber types preferred take into consideration economic aspects and the fiber types thus preferred are cellulosic fibers usually of the type conventionally employed in the making of paper or paper board. In this respect, conventional stock preparation procedures may ordinarily be used in the practice of the invention, in that the source of the cellulosic fibrous material may ordinarily be shredded, beaten or otherwise treated, chemically or mechanically, so as to obtain initially the desired dilute aqueous stock suspension of cellulosic fibers. Such cellulosic fibers may originate from waste paper or cloth products, industrial waste products such as bagasse, or similar fibers which have been proposed at various times in the prior art for use in the formation of paper, paper board or even paper-like articles. Essentially the cellulosic fibers from various sources are selected for practice in the instant invention on the basis of the usual commercial considerations which involve quality of the final product, cost considerations with respect to the original source material, color, strength, bleaching requirements, etc., all of which are well known to the skilled workers in the art and need not be elaborated upon herein. Typical so-called "pulps" include alpha cellulose, bleached kraft, unbleached kraft, mechanical pulps from various wood sources, rag pulps, bleached and unbleached ground wood and/or semi-chemical pulps, bleached and unbleached sulfite pulps, cotton linters (in natural fiber condition and/or in etherified or esterified condition). It will thus be appreciated that cotton linter esters or ethers can be used in certain conditions and for certain purposes in the practice of the instant invention when certain particular qualities of materials are desired, whereas in other situations it may well be desirable to use waste product pulps such as waste paper or rag pulps. When economy is of primary consideration a ground wood furnish or pulp is ordinarily considered the least expensive and more readily available and such a pulp is therefore preferred for this type of use in the practice of the instant invention. When more expensive molded pulp articles are desired, the cotton linters in one form or another may be used, or any of the various combinations of the pulps hereinbefore described may be used.

In any event, as a part of conventional stock suspension formation it is generally desirable to subject the stock in dilute aqueous suspension to what is known as the beating or refining operations, which again are conventional and need not be described in further detail.

In general, the dilute aqueous stock blend which is ultimately used is that having the general characteristics of stock suspensions employed in the molding of pulp articles. The dilute aqueous stock containing the selected fibrous component or components may be initially somewhat more concentrated for ease in handling (e.g. having consistencies of perhaps 1% to 5% on a dry fiber basis), but it is ordinarily desirable to ultimately carry out the deposition of the resin particles on the fibers in the dilute aqueous stock, using a consistency of approximately 0.01% to not more than about 2%. In such situations, if it is desired to deposit the resin on different types of fibers, it may be desirable to carry out such resin deposition under the preferred conditions for each type of fiber in a dilute aqueous stock containing only that type of fiber and then blend the fibers together in a subsequent blending of the resin treated stocks and in so doing it has been found generally preferable to obtain a consistency of about 0.05% which may be used directly for the formation of the fibrous pulp article in the manner hereinafter described. As used herein, the terms "percent" and "parts" mean percent and parts by weight unless otherwise specified.

In the practice of the instant invention the selection of the so-called "freeness" is of significance in that the initial dewatering and drying procedure is effected if not determined by the freeness.

The processing of the various ground wood pulps is carried out preferably to obtain a freeness of approximately 250 CSF (i.e. Canadian standard freeness); whereas when the more expensive cotton linters are used in the practice of the invention the stock preparation is ordinarily carried out to obtain a freeness as high as 750 CSF. It will thus be appreciated further that the various combinations and permutations of stock fiber systems make it possible to use in the practice of the invention freenesses ranging from as low as perhaps 200 to as high as perhaps 800 CSF. The stock preparation, of course, will involve what is generally considered to be the final stock preparation, which is beating or refining and the beating or refining time is sometimes considered reasonably significant, at least insofar as it may influence the freeness ranges and the like. In the practice of the instant invention it must be appreciated that the beating or refining will have to take into consideration the fact that after the initial beating or refining to obtain the desired random distribution of the cellulosic fibers in the dilute aqueous stock suspension, the resin particles, must be added and these resin particles will also have to be beaten into the dilute aqueous stock suspension in order to obtain the desired random distribution thereof, so there will be a total beating time for the stock which includes its preliminary beating and then the beating or refining that is carried out after the resin particles have been added. In addition, if separate stocks are to be prepared and separately treated with resin particles, then there will be still a final blending operation which is functional in part at least as a beating or refining operation and this must also be taken into consideration in preparing the final stock which will be used in the formation of the initial moist resin filled pulp article. The term resin "filled" is used conventionally at this stage, since the resin particles will be deposited on the fibers and the fibers themselves will (particularly in their expanded wet condition) appear to dominate the structure and character of the pulp molded article. In the subsequent pressure molding, which will be described hereinafter, which inovlves time, temperature and pressure sufficient to carry out the fusion of the thermoplastic resin and convert the same into the desired resin matrix, the final product then becomes a resin matrix that is filled with substantially dry randomly distributed, felted fibers. This terminology in and of itself is characteristic of the invention but it is not foreign to skilled workers in the paper making art and in the art of molding plastic articles.

Once a dilute aqueous stock suspension of cellulosic fibers has been prepared for treatment by the resin, the resin is introduced into this stock in any of a number of conventional ways, which include merely beating the extremely fine discrete particulate solid resin particles into the stock to form the desired suspension thereof, or it may involve separate preparation of an emulsion or dispersion of resin in the dispersed form in a continuous aqueous phase in a separate suspension and then addition of this separate suspension to the stock. To a certain extent the type of resin used will also be controlling or at least within the skill of the workers in the art in determining the mode of addition to the dilute aqueous stock suspension of cellulosic fibers.

Preferably, in the practice of the instant invention, a polyethylene resin is used, the preferred type of polyethylene resin being a medium density polyethylene (i.e. a density of about 0.9 to about 0.935), which is commercially available in extremely fine mesh powdered form. The finer the mesh the better for the practice of the instant invention, but commercially available polyethylene particles of the type hereinbefore described are available in mesh ranges from 150 to 250 mesh sizes (it being understood that the mesh sizes are the conventionally used sizes for known solid particle handling, i.e., 200 mesh being material that will pass a finely woven screen having approximately 200 wires per inch). The resin used may, however, be a polyethylene-polypropylene copolymer mixture or even a straight polypropylene resin, which resins are generically recognized in the resin industry as $C_2$–$C_3$ polyalkylene polymeric resins in discrete particulate form. It will also be appreciated that the particular polyethylene, polypropylene or blend thereof selected for use in the practice of the instant invention will determine to some extent at least the temperature employed in the drying or dewatering step which will be discussed in greater detail hereinafter. The resin particles, preferably in the very fine particle size hereinafter described are added to the dilute aqueous stock suspension preferably in the beater and the beating is then continued or carried on for approximately the same amount of time that was used in preparing initially the dilute aqueous cellulose fiber stock suspension. In other words, if the initial refining time for preparing the dilute aqueous cellulose fiber stock suspension is five minutes, then it is usually preferable to blend or beat the particulate resin into the stock suspension for another five minutes. As a typical example, the cellulosic fibers once pulped are mixed with water to approximately the consistency desired within the range hereinbefore set forth and refining thereof is undertaken (usually on a continuous production basis) for a brief period of time of perhaps one to five minutes, with about three minutes being preferred. Next, the particulate resin is introduced into the stock in the beater and the beating is either continued or is at least carried out for an additional period of time of perhaps another three minutes. Here again, it will be appreciated that it is well within the skill of the art to prepare a separate resin particle suspension, wherein the resin particles have already been randomly distributed and then blending with the dilute aqueous cellulose fiber stock is somewhat more simplified from the point of view of the final refining or blending time and conditions. On the other hand, it is an advantage of the instant invention that this procedure is not necessary and the very fine mesh polyethylene particles hereinbefore described may be added directly as solids to the dilute aqueous stock in the concentration desired and only a relatively short additional amount of beating or refining along the lines hereinbefore described, is required in order to obtain the desired random distribution of these resin particles in the dilute aqueous stock.

The amount of resin particles added, on a weight basis, as compared to the dry fiber weight in the dilute aqueous stock suspension may range from a minimum practical amount of about 1 or 2% to a maximum practical amount of about 20% on the basis of the dry fiber weight, although small amounts of resin may not be sufficient to afford enough resin body to form the desired final matrix and large amounts may result in waste, since the resin itself is ordinarily substantially more expensive than the cellulosic fibers. Thus the selection of the weight ratio of resin solids to fiber (dry) solids is preferably within the range of about 1:20 to 3:20 and in the use of preferred resin particle sizes of the type already described, a weight ratio of substantially 1:9 is found to be preferred.

In the beater the cellulose fibers often tend to develop a slight electric charge and the resin particles may sometimes develop the same electric charge so that pH adjustments or other conventional procedures that are employed in the resin treatment of fibers in aqueous stocks may be advisable for example, it is usually advisable to prepare a dilute aqueous kraft fiber stock of a consistency of, for example, about 1% in the beater and then add the polyethylene resin particles of substantially 200 mesh size in an amount equal to about 0.1% of the dilute aqueous stock with a beating of the dilute aqueous stock for about three minutes before and then three minutes after the addition of the resin particles. Next alum is preferably added to adjust the pH to approximately 4 to 4.5 and this effectively "breaks" any tendency of stable suspension whereby the polyethylene particles will tend not to deposit upon the cellulosic fibers. Instead, such adjustment of the pH results in a substantially uniform deposition of the polyethylene particles on the fibers with reasonably good adherence thereto, so that the minute resin particles will not be washed away during the wet pulp article formation.

It will be appreciated that alum is not necessarily employed for purposes of effecting this deposition of the polyethylene resin particles onto the cellulosic fibers, but the use of alum for purposes of pH adjustment in paper making is conventional and well understood and, from an economic point of view, its use is ordinarily preferred. The pH adjustment will involve adjusting to a pH usually within the range of about 4 to about 5, with 4.5 being preferred, as previously indicated. It will be appreciated that lower pH's will tend to create too much of an acid condition in the stock and the stock becomes unnecessarily corrosive toward the metal equipment usually being used. As a general rule of thumb, which applies here, approximately ½ pound of alum is used for every 5 pounds of cellulosic fiber in the dilute aqueous stock, referring to the cellulosic fiber on a dry fiber basis, and using conventional papermakers' alum. The matter of this pH adjustment is well within the skill of the art and the skilled worker will, of course, recognize whether or not the particular combination of dispersed resin particles and cellulosic fibers is actually resulting in the desired deposition of the resin particles on the fibers. The procedure itself is well understood by the skilled worker, given a certain stock containing cellulosic fibers and given the resin powders of the instant invention uniformly beaten into this stock. The fundamental theory is that the resin particles seem to develop a cationic charge in such pH adjustment and they are then very readily attracted to the heretofore negatively charged cellulosic fibers (which presumably have developed their charge during the beating operation).

The next step in the practice of the instant invention involves the formation of the so-called wet pulp article, which is formed preferably again using conventional forming procedures for wet pulp articles, such as the previously mentioned application set forth herein.

It will be appreciated, however, that as a preliminary to the formation of the moist pulp articles, the desired consistency is obtained. As previously mentioned, this consistency may range from about 0.01% to perhaps not more than about 2%, and preferably in the practice of the instant invention the consistency employed is about 0.05%, which means that the previously described approximately 1% consistency used in the incorporation of the resin into the dilute aqueous stock and the deposition of the resin on the cellulosic fibers must be diluted further to the consistency of 0.05%, again in accordance with conventional procedures for adjusting consistency to the desired percent for use in web or pulp article formation.

The resulting stock of the preferred consistency of 0.05% is then forced through or against a porous forming surface or mold to deposit the resin particle filled fibrous pulp article on the porous surface of such forming surface. Preferably this is done using a mold having a surface defined by minute glass beads or small size ceramic particles of the type described in our aforesaid application bonded together by epoxy resin or some other resin typically inert to the aqueous stock system and also of good bonding characteristics for the glass beads or similar solid particles. The description of molds of this type does not require elaboration in view of the prior disclosure referred to hereinbefore, but it will be appreciated that the formation of the mold involves the use of extremely fine sized beads or particles which are ordinarily covered with an excess of epoxy resin in order to make sure that the amount of resin used is sufficient and are then formed into the shape of the mold ultimately desired using extremely fine mesh screens which are finely woven and of sufficiently fine mesh to retain the glass beads or similar solid particles, and the mass of epoxy resin and glass beads is then usually blown with air while mounted on such forming fine woven screens so that excess epoxy resin will be forced through the screens and the resulting material will then have what essentially constitutes stacked bead or particle structure with the individual beads or particles having a substantially molecular or macromolecular layer of resin thereon, so that the resin will cover unnecessary pores or traps in the glass beads and also bond touching glass beads together. The blowing of the air through the molding material before the setting of the epoxy resin is, of course, carried out for the purpose of providing the necessary continuous porosity in the mold so that it will be functional in the subsequent steps.

The form of the mold may thus be any of a number of configurations. For example, a cylindrical molded pulp article may be formed from the previously described resin treated stock by forcing the stock from the interior through a female glass bead-epoxy bound mold of the type previously described, which presents a cylindrical inner surface to deposit a relatively thick fibrous web layer on the female mold surface. A porous male mold member is optionally then clamped down on the fibrous pulp article in the female mold to press some of the water therefrom and hot dry air is preferably passed through the molds to dry the resulting cylindrical molded pulp article. In contrast, a male mold member of this same glass bead-epoxy resin structure may be introduced into the dilute aqueous stock, with a vacuum drawn on the interior of such male mold to form the desired moist fibrous pulp article or layer on the outer surface or the forming surface of such male mold, and with or without the clamping of a female mold thereon, the wet molded article is (of course first withdrawn from the dilute aqueous stock) then dried either by the continuous use of a vacuum in the interior of the male mold member to cause ambient dry air to be drawn through the fibrous pulp article, or by positive blowing of dry warmed air against the pulp article on the male mold member, or through an exterior female mold member clamped thereon, in any event preferably blowing the air completely through the fibrous pulp article thus molded until the same has reached a dryness of preferably about 92 to 94% bone dry, at least about 90% bone dry is desired for the preparation for the final molding step. The temperature of the drying air thus used is preferably in the neighborhood of about 200° F. to about 250° F., which is approximately 200° F. to 250° F. below the fusion or softening temperature of the polyethylene. It is desirable to maintain the warm dry air at a temperature substantially below the recognized fusion temperature for the polyethylene, polypropylene or similar resin employed, for the reason that it is not desired to effect any significant amount of fusion of the resin particles at this stage in the process. The resin particles will have good adherence on the cellulosic fibers by virtue of the deposition process and the resin particles will not be lost or otherwise rearranged in any way within the fibrous pulp article by the so-called "through drying" process, which involves the passing of relatively substantial quantities of dry air against and through the body of the pulp article until the desired drying is accomplished. It will be appreciated that this procedure is distinctly different from and superior to any drying procedure which involves casting and drying the pulp article on a heated metal surface such as a dryer, because this procedure will tend to cause migration of the resin particles in the direction of the heated dryer surface, with consequent sticking and other apparent undesirable results. It will also be appreciated that the heated dryer surface could conceivably be used in the practice of the invention if one were absolutely certain that the heated dryer surface would be maintained continuously substantially below the fusion temperature of the resin particles. In conventional paper making drying operations, however, the steam entering the dryer enters on a relatively high temperature in the interior of the dryer shell and the exterior of the dryer shell is actually cooled continuously (so that there is a temperature gradient across the radial dimension of the dryer shell) by virtue of the continuous evaporation of water in the cellulosic fibers, but in a situation wherein resin particles are present, these resin particles may tend to migrate to the surface of the hot dryer and, not having the benefit of evaporation of water in the body thereof (as in the case of the cellulosic fibers), the resin particles will not be cooled in the same manner and the so-called dryer surface temperature will become a misleading numerical figure for the purposes of this invention and there will be fusion of the resin particles on the dryer surface. It must also be appreciated that the resin particles have an expressed, commercially known fusion temperature of perhaps 400 to 500° F., depending upon the particular method of producing the same, but this is a temperature that is expressed in the language and for the purpose of understanding by synthetic resin molders, who will heat substantial bodies of the resin and will not be concerned with the heating of extremely minute particles of the type with which we are here concerned, and which have vast ratios of area to volume such that heat absorbed by radiation, conduction and convection has a magnified effect, particularly in the case of the use of a hot metal dryer surface, and the control of the fusion of these particles or the control of the operation so as to avoid the premature fusion of these particles is not at all a simple matter and is not, in fact, the type of simple matter that is sometimes represented in prior art disclosures.

Perhaps the simplest expedient in explaining the difficulties of the phenomenon or phenomena here involved is based upon the relationship between surface area exposed to heating sources and volume. Thus, if we are to take a sphere having a diameter of, for example, 1 centimeter, the calculation of the ratio of surface area in square centimeters to volume in cubic centimeters is a matter of elementary mathematics and this ratio is a low number, expressed numerically. If the 1 centimeter sphere is reduced into a multiplicity of spheres having one millimeter in diameter but totalling the same volume as the original volume of the sphere having 1 centimeter in diameter, the ratio of surface area to volume is multiplied by 10. The volume remains the same but the surface area increases by a factor of 10. Thus, if we are to reduce the sphere of 1 centimeter diameter to an equal volume of spheres having only 1 micron diameters, we find that we have multiplied the surface area by a factor of substantially 100,000,000 times, and we are talking about surface areas in the neighborhood of acres for this relatively minute total volume of material. In such situations, it must be appreciated that the effect of radiant heat and the effect of all forms of heat or energy must necessarily be greatly multiplied because the specific heat of the total volume of material to be heated remains the same whereas the surface area receiving all of this energy has been fantastically increased.

For the foregoing reasons, it will be appreciated that the type of heat transfer employed in drying the pulp article is essentially convection, through the medium of the warm dry air passing through the resin filled fibrous article and the actual temperature of the air employed does not exceed a temperature that is at least about 100° F. and preferably about 200° F. below the so-called commercially recognized fusion temperature for the resin particles. Of course, the mold itself in the form of the glass beads bound by the epoxy resin will warm approximately to this temperature also, but the source of heat warming this porous mold will not have a temperature in excess of the temperature of the warm air and thus we do not have a situation which involves high temperature steam at one side of a metal surface and a resin particle receiving heat by conduction and/or radiation on the surface of the metal opposite this high temperature steam, with such resin particle having practically 0 volume and thus requiring a very negligible amount of total heat to effectively fuse the same. Nor, of course, do we employ radiant heat sources or other types of heat sources which would be capable of radiating heat energy in such quantity that the tremendous surface area of the resin particles would result in absorption of heat at a rate faster than it could be dissipated or lost, such as to cause fusion of the resin particles.

In essence, the drying temperature is carried out actually by using this warm air and passing the same through the fibrous layer on the porous forming surface or between porous forming surfaces for only a brief period of time such that the time-temperature conditions are less than that required to fuse the resin particles. Another aspect involved in this initial dewatering or drying process involves the use of what constitutes very nominal pressures. It will be appreciated that the application of pressure to resin will reduce the fusion temperature, but in the practice of the instant invention the pressure applied to effect nominal or preliminary dewatering of the wet pulp article is a pressure that is essentially absorbed by the fibers themselves in their wet expanded condition and is not a pressure that is transmitted significantly to the discrete resin particles; nor is it a pressure of any substantial figure, because crushing of the cellulosic fibers is not desired or contemplated as a part of the drying operation. The drying operation is essentially a dewatering operation with some natural shrinkage of the fibers taking place during the drying, but not with the application of substantial pressures thereto which pressures might have to be absorbed by the individual resin particles.

After the drying has been carried out in accordance with the practice of the instant invention, which will ordinarily take a short period of time ranging from perhaps 10 to 60 seconds, the fibrous article is ready for the actual hot molding process. The drying time, as indicated, may range from 10 to 60 seconds in preferred operations, but it will vary with different types of cellulosic fibers. Thus in the case of cotton linters a drying time of perhaps 15 seconds may well be sufficient, whereas in the case of the cellulosic fibers from typical wood pulps, the hydration effect resists the most rapid type of drying and perhaps 35 seconds might be required as a typical drying procedure in the "through drying" or warm gas drying process.

In this respect also, it should be noted that the drying procedure itself does preferably involve merely the forcing of warm air through the moist fibrous article, since this is logically the least expensive procedure. In certain special cases, certain other gases may be used or even other fluids which have a dehydrating effect. The essential idea involves the passing of a fluid through the moist fibrous article in such a way as to dewater the same without removing or disturbing the resin particles or their adherence to the cellulosic fibers, and without fusion or otherwise disturbing such resin particles. Thus a fluid such as a mixture of substantially anhydrous isopropyl alcohol and toluene could be forced through the moist fibrous article on the porous forming surface, but again this type of fluid would tend to soften and otherwise disrupt or carry away the resin particles, since many polyethylenes are at least somewhat sensitive to certain solvents and the net effect of a solvent which does not actually dissolve the resin particle might well be to soften and impart conditions comparable to fusion to the resin particles and these conditions are not desirable in the practice of the instant invention. The most nominal or insignificant type of softening might occur, but basically the so-called "through drying" using a dehydrating type of fluid that is forced through the moist fibrous pulp article involves the use of a fluid which is capable of carrying away water but is otherwise substantially inert with respect to the resin particles and, of course, with respect to the cellulosic fibers themselves. Because of the considerable resistance to solvent action that is characteristic of polyethylene resins, certain types of anhydrous but water attractive or attracting liquids could be used, such as for example, substantially anhydrous methanol in order to carry out dehydration at room temperature or temperatures at least substantially below those ordinarily employed for the warm air, but in the interests of economy, this type of drying fluid would ordinarily not be used except in unusual circumstances. Moreover, the use of drying fluids of this type would require a certain amount of caution in connection with subsequent hot pressing and safety factors are obviously involved.

After the resin filled moist fibrous pulp article has been dried to at least about 90% bone dry, it is then ready for the final molding process. The final molding process is carried out preferably in highly polished dyes having surface finishes in the neighborhood of 5 to 10 microns (which surfaces are readily available on ductile metal dyes), and using relatively high pressures in the neighborhood of 300 to 500 pounds per square inch (with about 350 pounds per square inch being preferred). In general, approximately 500 pounds per square inch is understood to approach the crushing point for the cellulosic fibers and this result is usually not desired. The dye temperatures themselves in the final hot pressing operation may range from about 300 to 400° F. and about 350° F. is preferred. In the practice of the invention it will be appreciated that it is a combination of pressure and temperature that is employed to carry out the final hot pressing operation in the preferred circumstances, for the reason that the usual or conventional molding temperature for polyethylene of approximately 450° F. or above is ordinarily a little bit too high for cellulosic fibers and may cause deterioration thereof which is not desirable. The invention affords the advantage of permitting the use in combination of pressure and temperature such that no deterioration of the cellulosic fibers is involved while at the same time the desired fusion of the resin particles is achieved. This fusion of the resin particles, using the preferred concentrations of resin to dry fiber results in a very smoothly finished article in which what appears to be a very small amount of resin (and, incidentally, a very economic amount of resin) develops as the resin matrix or substantially continuous phase in the system and the randomly disposed felted cellulose fibers provide reinforcement in this highly filled resin matrix of the ultimately formed molded hot pressed article.

The resulting product has particular utility as a container, such as a plate or cup, in that the presence of the very large amount of cellulosic fiber fillin therein affords excellent heat insulation and the combination of resin and fiber results in excellent strength or structural properties at very modest expense.

The selection of mirror finish dyes in the practice of the instant invention seems to give an unusually good result, and in this respect this may also be as a consequence of the very substantial surface area of the resin particles present in the dried fibrous pulp article that is molded in the hot pressing operation. In any event, the dye finishes of 5 to 10 microns which will be mirror finishes for the ductile metal dyes here employed impart an excellent appearance, structure and other desirable properties to the finally hot pressed articles. The pressing, combined with the temperature, serves to cause the desired flowing of the polyethylene and/or polypropylene resin so that the various discrete particles thereof are fused together into an integral monolithic body, and the resin seems to flow to the surfaces of the hot metal dyes in a manner which is now highly desirable in connection with the formation of the final product, although it has already been explained herein that this type of movement of the resin at an earlier stage in the drawing of the cellulose fibers is not desirable. Under the pressure and temperature employed, the final product appears to have a continuous very smooth resin surface or film over the entire exterior (both inside and outside of containers) of the article thus molded. It has been found, also, that in certain instances one of the dye elements may be chrome plated and heated and the other may be formed of polytetrafluoroethylene (i.e. Teflon), or one of the dye surfaces may have known anti-sticking agents such as silicone greases applied thereto. Thus a pair of mating chrome plated dyes may sometimes function more satisfactorily, even in an extremely highly polished and well finished condition, by the preliminary application thereto or the periodic application thereto of the known "release" agents that are used in conventional molding practices and these mold release agents at the present time include as preferred types of materials the known commercially available silicone greases. Other known mold releasing agents may, of course, be used but the temperatures involved would suggest the mold releasing agent preferred and the silicone greases are known to be quite temperature resistant.

Although the preferred procedures of the invention have already been described in substantial detail, a simple demonstration thereof may be carried out as follows:

*Demonstration A*

A dilute aqueous kraft fiber stock is made up to 1% consistency in a beater, operating the beater for three minutes, and 0.01% of the aqueous stock (by weight) of medium density polyethylene fine particles (150 to 250 mesh) resin is added directly to the beater and beating is continued for another three minutes. Next, alum is added in an amount sufficient to reduce the pH to 4.5 and this effectively deposits the polyethylene particles onto the cellulose fibers.

Next, the previously described resin treated aqueous stock is diluted to a fiber consistency of 0.05% and a glass bead-epoxy bound mold of the type previously described in the form of a male mold member is briefly submerged in the stock and a vacuum is drawn on the interior of the mold to form a fibrous pulp layer thereon having a thickness on the male mold member of about 1 millimeter, and the male mold member is then removed from the stock and placed in a controlled dry air temperature zone wherein the air is maintained at 200° F. and vacuum is continued on the interior of the male mold member for approximately 35 seconds, which results in drying to substantially 92% bone dry condition in the resulting resin filled fibrous pulp article. Next the article is removed from the male mold member and placed between a pair of male and female chrome plated mirror finished molds having approximately the general configuration of the previously described male glass bead-epoxy resin mold (so that there will not be too much distortion or rearrangement of the article during this final hot pressing step), and the molded article is then obtained by pressing the heated male mold member at approximately 350° F. against the female mold member so as to generate a molding pressure against the fibrous article of approximately 350 pounds per square inch and this pressure and temperature is employed during the pressing stage for only about 30 seconds.

It will be appreciated in this instance that the time element is one that is readily ascertained on the basis of the maximum temperature and pressure preferred, since the time element involved will then be determined on the basis of the minimum time which permits the uniform molding of the article at the temperature and pressure involved. In the present instance a molded article is formed having substantially the shape of a 4 ounce paper cup with frusto-conical walls flying away from the generally flat bottom of the cup at a cone angle of about 10°. This shape is used for convenience in demonstration and for convenience in taking the article in and out of the mold. Preferably also during rapid sequential molding the chrome plated mirror finished molding surfaces are both coated intermittently with silicone mold release agents available in the trade, but this is not absolutely necessary. The mirror finish for the chrome plate is a finish of 2.5 to 5 microns. The positive mold member formed from the glass beads and epoxy resin is, like the chrome plated pressure mold positive member, of substantially the same frusto-conical shape and size.

*Demonstration B*

A procedure is carried out that is the same as that described in connection with the previously described Demonstration A, except that cotton linters are used in place of the kraft fiber, in exactly the concentrations set forth in Demonstration A, and the only difference in the procedure is that the drying time on the glass bead mold in the 200° F. oven is only about 15 seconds, but otherwise the procedure is the same and the result appears to be a very high quality cup with high gloss on the surface thereof. The kraft filled cup will actually show the fibers in the body thereof in view of the very thin film of polyethylene covering the same, but the less expensive kraft filled cup has unusual properties in connection with heat insulation and both cups have excellent structural characteristics and appearance.

*Demonstration C*

The procedure of Demonstration A is repeated using a commercially available 50–50 polyethylene-polypropylene copolymer of the same particle size and in the same quantities described in Demonstration A, and it is found that the resulting product is substantially the same, although a somewhat higher fusion temperature in the resin makes it advisable to carry the hot pressing operation out for approximately 10 seconds longer in order to obtain optimum uniformity in the finally molded product.

In making reference to the instant process and the methods and apparatus employed in carrying out the same, it will be appreciated that there is a "curing" of sorts which takes place as the polyethylene or polypropylene is pressed and heated into the integral monolithic matrix that is ultimately formed between the matched highly polished heated metal dyes. In the sense that the word "cure" ordinarily means heating to harden or oxidizing to harden, the polyethylene or polyproplylene is not really cured in the practice of the instant invention. Of course, it is ultimately removed from the mold in hardened or "cured" condition, but really it is heated under pressure so that it will flow and in flowing it merges with other particles to form the monolithic integrated highly filled product and the matrix itself is the truly monolithic aspect of the final products, whereas the cellulosic fibrous filler in this monolithic matrix is functional essentially as a reinforcement, the basis for heat insulation, the inexpensive source of bulk for ease in handleability and structural strength, and, in effect, a stabilizing influence in the ultimately formed articles of the invention. The cellulosic fibers here employed are preferably dried to approximately 92 to 94% bone dry in the practice of the invention and drying beyond this stage is not particularly desirable for the reason that cellulosic fibers in the condition in which they exist in the finally molded resin matrix would have a distinct attraction for the moisture of the ambient atmosphere if they were in fact dried substantially beyond the range of about 90% to about 94% bone dry and this would tend to cause instability rather than stability in the finally molded article in that there would be a tendency for moisture to permeate the "substantially" water impermeable polyethylene barrier forming the matrix and at the slightest opening or porosity in the polyethylene forming the matrix and particularly the smooth outer surfaces of the article the water would permeate this barrier and would then seek an equilibrium condition between the ambient conditions of humidity and moisture content of the cellulosic fibers in the container or other form of plastic article that is ultimately obtained herein. As has been pointed out previously, the polyethylene does form such an effective moisture barrier that the cups, containers or similar devices formed in the practice of the instant invention having bottoms in generally cylindrical or inverted frusto-conical walls will, in fact, retain not only liquids such as coffee or the like but hot liquids without burning the hands holding the cup, but it must be appreciated that this is a temporary type of condition; whereas during prolonged storage the humidity of the ambient atmosphere would have an effect upon the cellulosic fibers embedded in the matrix of the resin in the articles of the invention, if the moisture content of the cellulosic fibers is too far away from what would constitute "equilibrium" conditions. Thus if the articles of manufacture of the instant invention are to be stored in an extremely humid area and retained there for substantial periods of time, it is altogether possible that drying of the cellulosic fibers to perhaps less than 90% bone dry in the earlier dehydration step is altogether desirable, to the end that there would not be a driving humidity or moisture attraction gradient across the polyethylene barrier in these retainers or other plastic articles during the ordinary conditions of storage. It will be appreciated that if the cellulosic fibers take up substantial quantities of water during prolonged storage or release substantial quantities of water during prolonged storage (depending, of course, upon the conditions of storage) the net result will be some lack of dimensional stability in the articles, resulting in warping or other disfiguration, which can of course be tolerated to some extent but not to excessive extents. The moisture barrier that is formed by the polyethylene and/or polypropylene resins particularly is most effective in combination with the cellulosic fibers to minimize this tendency toward dimensional instability in the absence of drastic moisture differentials between the ambient storage atmosphere and the retained water content of the cellulosic fibers. The instant invention affords the unique advantage of selection of the retained moisture content of the cellulosic fibers (during the drying process hereinbefore described) to the extent that these factors may be taken into consideration. Of course, there is the limitation that during the rapid hot pressing conditions here employed, excessive quantities of water could not be pressed on the cellulosic fibers or there might be a tendency to volatilize the same, but the essential bulk of the cellulosic fibers here involved tends to preclude any difficulties along this line. In this respect, attention might be directed to the rather old and well-known art of molding the various urea-formaldehyde resins which are known to give off water during their molding process and which are molded in the presence of sawdust or some other type of cellulosic material for the purpose of receiving this water so that the finally molded articles will have dimensional stability. In the instant invention polyethylene does not give off water during its so-called "curing," but instead merely melts and fuses with other polyethylene particles in the conventional manner of thermoplastic resins. In addition, the pressures are employed in the magnitude hereinbefore specified such that the temperatures, likewise, employed in the ranges herein specified will not cause any disruption of the molding process by virtue of volatilization of the minute amounts of water that are entrapped in the molded articles hereof. Instead, the entrapment of this water in the cellulosic fibers of the molded articles hereof serves to stabilize the same during storage, for the reasons hereinbefore explained, and this quantity of moisture may be varied within even broader limits than the 90% to 94% bone dry range hereinbefore described, to suit particular needs of storage or the like, consistent with the principles hereinbeore discussed.

It will further be appreciated that other modifications may be made without departing from the spirit and scope of the instant invention.

I claim as my invention:

1. A method of forming a molded fibrous pulp article, which comprises
    (a) forming a dilute aqueous stock suspension of cellulosic fibers
    (b) depositing $C_2$–$C_3$ polyalkylene polymeric resin in discrete particulate form on the fibers in such stock;
    (c) forcing the resin-containing stock through a porous forming surface to deposit a resin particle filled fibrous pulp article on such surface;
    (d) forcing drying gas of at least 100° F. below the softening temperature of the resin through said article and the porous surface carrying the same to substantially dewater the article to at least 90% bone dryness under time-temperature conditions less than those required to fuse the resin; and
    (e) subjecting the dewatered article to time-temperature-pressure-shaping conditions of from approximately 300 to 500 p.s.i. and from approximately 300° to 400° F. and for a time sufficient to fuse the resin to form a fiber-filled resin matrix of predetermined configuration.

2. The method of forming a molded fibrous pulp article as defined in claim 1 wherein said resin is polyethylene.

3. A method of forming a molded fibrous pulp article, which comprises
    (a) forming a dilute aqueous stock suspension of cellulosic fibers;
    (b) depositing $C_2$–$C_3$ polyalkylene polymeric resin in discrete particulate form on the fibers in such stock;
    (c) forcing the resin-containing stock through a porous forming surface to deposit a resin particle filled fibrous pulp article on such surfaces;
    (d) subjecting the article to pressure between porous surfaces and blowing dry warm air of at least 100° F. below the softening temperature of the resin through the article to substantially dewater the article to at least about 90% bone dryness under time-temperature-pressure conditions less than those required to fuse the resin; and
    (e) subjecting the dewatered article to time-temperature-pressure-shaping conditions of from approximately 300 to 500 p.s.i. and from approximately 300° to 400° F. and for a time sufficient to fuse the resin to form a fiber-filled resin matrix of predetermined configuration.

4. A method of forming a molded fibrous pulp article, which comprises
    (a) forming a dilute aqueous stock suspension of cellulosic fibers;
    (b) depositing $C_2$–$C_3$ polyalkylene polymeric resin in discrete particulate form on the fibers in such stock;
    (c) forcing the resin-containing stock through a porous forming surface to deposit a resin particle filled fibrous pulp article on such surfaces;
    (d) subjecting the article to pressure between porous surfaces and blowing dry warm air of at least 100° F. below the softening temperature of the resin through the article to substantially dewater the article to at least about 90% bone dryness under time-temperature-pressure conditions; and
(e) pressing the dried article between smooth heated surfaces to subject the articles to time-temperature-pressure-shaping conditions of from approximately 300 to 500 p.s.i. and from approximately 300° to 400° F. and for a time sufficient to fuse the resin to form a fiber-filled resin matrix of predetermined configuration.

5. A method of forming a molded fibrous pulp article, which comprises
(a) forming a dilute aqueous stock suspension of cellulosic fibers;
($a_1$) subjecting the stock to beating action to randomly distribute the fibers therein;
($b_1$) adding to the beaten stock discrete fine particulate 150 to 250 mesh size solid bulk polyethylene resin in a resin to dry fiber ratio of 20:1 to 4:1;
($b_2$) subjecting the resin-containing stock to an additional beating action to randomly distribute such particulate resin in aqueous suspension in the stock;
($b_3$) adjusting the pH of such suspension to effectively deposit the resin particles on the fibers;
(c) forcing the resin-containing stock through a porous forming surface to deposit a resin particle filled fibrous pulp article on such surfaces;
(d) forcing drying gas of at least 100° F. below the softening temperature of the resin through said article and the porous surface carrying the same to substantially dewater the article to at least 90% bone dryness under time-temperature conditions less than those required to fuse the resin; and
(e) subjecting the dewatered article to time-temperature-pressure-shaping conditions of from approximately 300 to 500 p.s.i. and from approximately 300° to 400° F. and for a time sufficient to fuse the resin to form a fiber-filled resin matrix of predetermined configuration.

References Cited by the Examiner
UNITED STATES PATENTS

| | | | |
|---|---|---|---|
| 1,842,647 | 1/1932 | Baekeland | 162—207 |
| 2,739,058 | 3/1956 | O'Flynn et al. | 162—168 |
| 3,049,466 | 8/1962 | Erlich | 162—206 |
| 3,084,091 | 4/1963 | Volkman et al. | 162—206 |
| 3,094,454 | 6/1963 | Moore | 162—207 |
| 3,121,658 | 2/1964 | Orsino et al. | 162—183 |

FOREIGN PATENTS 314,937  11/1929  Great Britain.

DONALL H. SYLVESTER, *Primary Examiner.*

S. LEON BASHORE, *Examiner.*